R. J. WATSON AND A. E. OZOUF.
HOG HOIST.
APPLICATION FILED JULY 23, 1917.
1,317,745.
Patented Oct. 7, 1919.
3 SHEETS—SHEET 2.
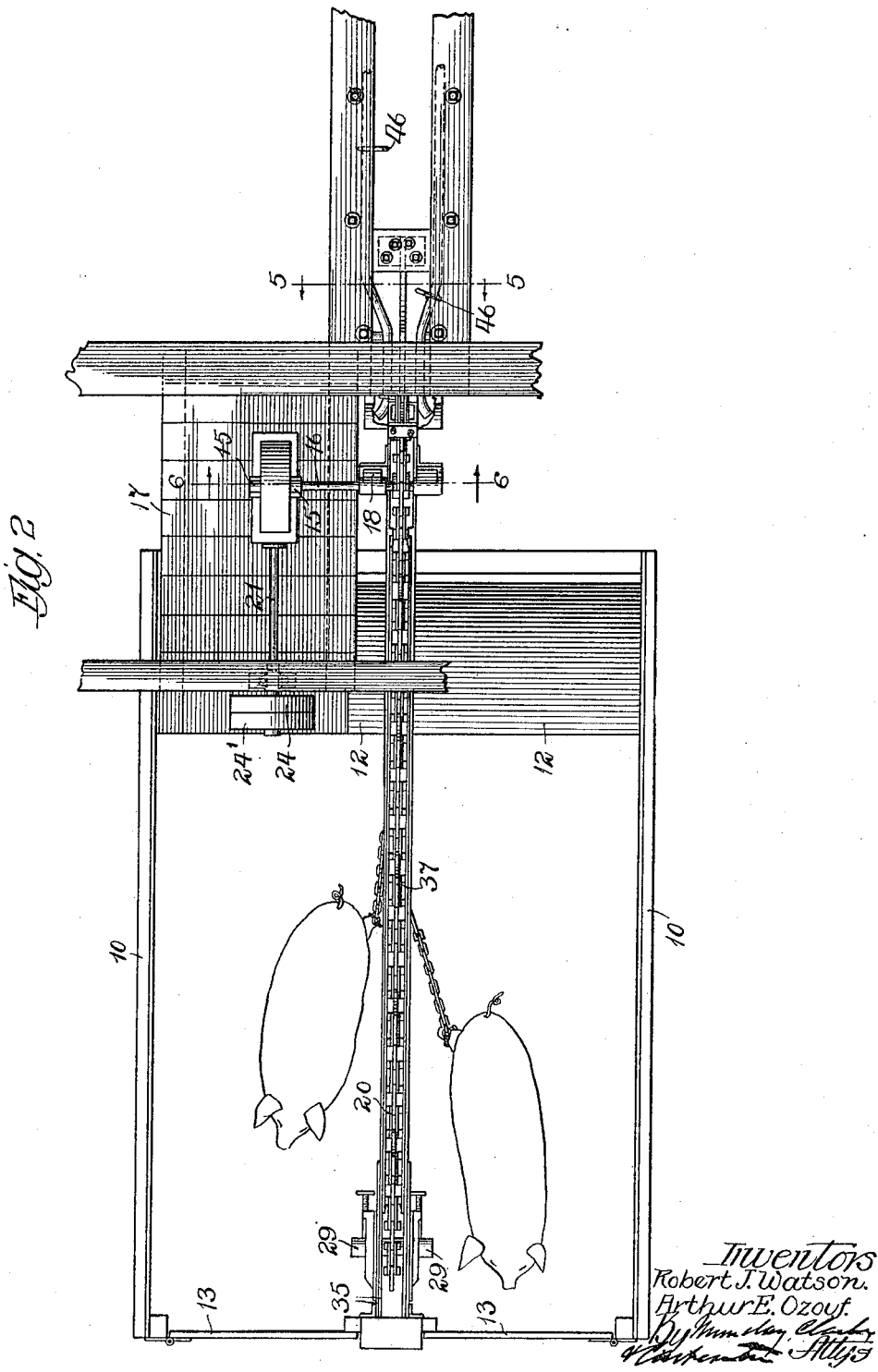

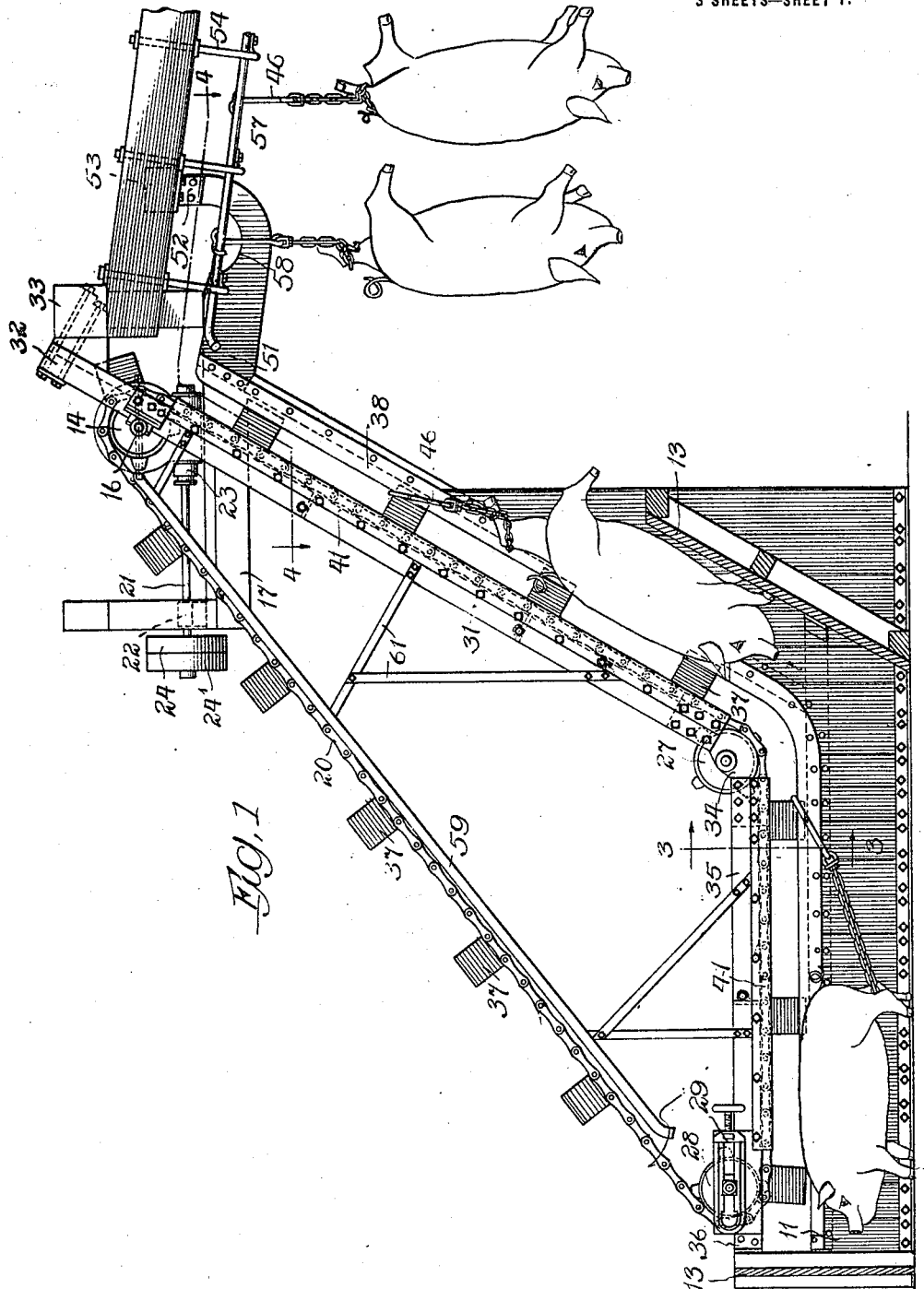

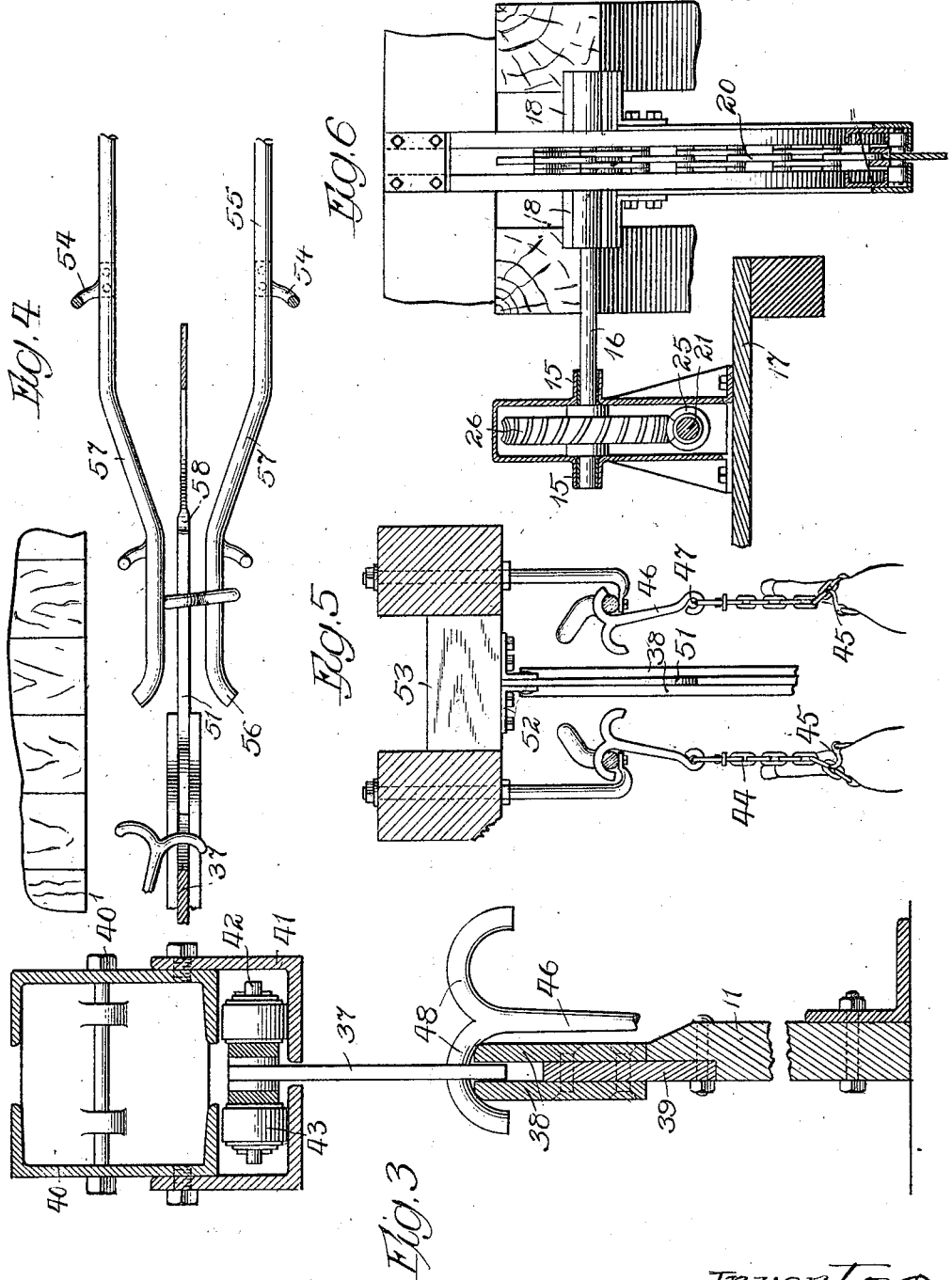

UNITED STATES PATENT OFFICE.

ROBERT J. WATSON AND ARTHUR E. OZOUF, OF CHICAGO, ILLINOIS, ASSIGNORS TO THE ALLBRIGHT-NELL COMPANY, OF CHICAGO, ILLINOIS, A CORPORATION OF ILLINOIS.

HOG-HOIST.

1,317,745.  Specification of Letters Patent.  Patented Oct. 7, 1919.

Application filed July 23, 1917. Serial No. 182,135.

*To all whom it may concern:*

Be it known that we, ROBERT J. WATSON and ARTHUR E. OZOUF, citizens of the United States, residing in Chicago, in the county of Cook and State of Illinois, have invented a new and useful Improvement in Hog-Hoists, of which the following is a specification.

This invention relates to hog hoists provided in packing plants to lift the live hogs to a bleeding rail where they may be killed and bled.

An object of this invention is the provision of a hog-hoist in which the shackled hogs may be drawn out of and away from either side of a shackling pen and carried up along elevating rails from which they are automatically switched and discharged to corresponding bleeding rails, so that a plurality of bleeding rails may be fed by an apparatus that is independent of them and at the same time has a great load-lifting capacity with a conveyer-mechanism that is free of attachment to the load propelled along the rails.

Other objects and advantages of the invention will be apparent as it is better understood from the following description when considered in connection with the accompanying drawings illustrating a preferred embodiment thereof.

Referring to the drawings,

Figure 1 is a side elevation of a hog hoist embodying our present invention;

Fig. 2 is a top plan view of the same;

Fig. 3 is an enlarged section taken substantially on the line 3—3 of Fig. 1;

Fig. 4 is an enlarged section taken substantially on the line 4—4 of Fig. 1;

Fig. 5 is an enlarged section taken substantially on the line 5—5 of Fig. 2; and Fig. 6 is an enlarged section taken substantially on the line 6—6 of Fig. 2.

The hog hoist shown on the drawings for the purpose of illustration and embodying our present invention comprises a traveling endless conveyer which moves horizontally past the shackling station and thence up at an angle to a bleeding rail height. This conveyer is provided with a plurality of outwardly extending wings which move between conveyer or elevating tracks or guides throughout the operative travel of the conveyer. The hogs are shackled in the usual manner by securing a chain around one of the hind legs and then a specially constructed shackle hook at the end of the chain is hooked over the conveyer tracks or guides and in the path of the wings. The movement of the wings between the tracks or guides causes them to engage with the shackle hooks and carry the hogs along first horizontally and then up away from the attendant to the upper end of the tracks. The bleeding rails are arranged near the upper end of the tracks and the shackle hooks are formed to engage over the bleeding rails as they leave the tracks. The tracks or guides are preferably located between two shackling pens and in the present embodiment of the invention, two bleeding rails are provided, one to receive the hogs shackled in one pen and the other to receive the hogs shackled in the other, all of which will now be described in detail.

The two shackling pens are disclosed in the structure indicated on the drawings and consist of outer side walls 10, a center partition or wall 11, inclined rear walls 12 and hinged front walls or doors 13, through which the hogs may be admitted to the shackling pens. The conveyer 20 is mounted above the central partition 11 and in the present instance is of link or chain form. This conveyer is engaged by a driving sprocket or tooth pulley 14 mounted on a shaft 16 in bearings 15 extending up from an elevated platform 17, and also in bearings 18 carried by the framework of the hoist. A main power shaft 21 mounted in bearings 22 and 23 on the platform carries power and loose pulleys 24 and 24' at one end and a drive worm 25 at the other (see Fig. 6). The drive worm 25 meshes with a worm gear 26 on the shaft 16 so that constant rotation of the pulley 24 imparts a constant rotation to the driving sprocket or tooth pulley 14. The conveyer takes over also two idle pulleys 27 and 28, one of which, 28, has adjustable bearings 29 to take up the slack in the conveyer. The pulleys 27 and 28 are supported in the frame of the conveyer and this frame comprises a pair of inclined channel irons 31 extending parallel to and just above the upward inclined part of the travel of the conveyer and supported at their upper ends 32 on a cross-rafter or member 33 and at their lower ends by plates 34 which provide bearings for the pulley 27 and which connect with a similar pair of horizontal channel members 35. The channel members 35 are supported partly by the plates 34 and partly by a post 36 at the front of the apparatus. Cross braces 40 held in place by bolts 40' between the channel members 33 and 35 are provided to constitute each pair of channels a beam of appropriate strength.

The conveyer 20 is provided with a plurality of outwardly extending rectangular blades 37 which travel between a pair of conveyer track elevating guides or rails 38 mounted upon the top of the partition 11, being, in the present instance, fastened to an upwardly extending center web 39. These tracks or guides 38 are disposed adjacent and extend continuously along the operative parts of the travel of the conveyer, i. e., first horizontally past the shackling station and on the partition between the pens and thence upwardly to the bleeding rails. At the top they are supported by an arm 51 which is secured by brackets 52 to an overhead support 53. In the operation of the apparatus the hogs are shackled and the free ends of the shackle chains are hooked over the rails 38 at any point handy to the attendant at the time. The first conveyer blade to pass engages the shackle hook and slides it along the tracks first horizontally and then up the incline to the height of or a little above the bleeding rail. The shackle chains 44 are of the ordinary link form shown in Fig. 5 having a small hook 45 at one end adapted to be hooked about or in the chain to hold the leg of the hog and having a specially constructed shackle hook 46 at the other. This hook consists of a main body having an eye 47 at one end engaging the shackle chain and having two oppositely extending hook arms or lobes 48 at the other, either of which may be hooked over the rails 38. The conveyer throughout the horizontal and upward portions of the conveyer travel, i. e., its operative portions, is held to an accurate path by angle guides 41 extending down from and inwardly beneath the channel irons 31 and the main frame, the edges of these angle guides being spaced apart a sufficient distance to permit ready passage of the wings or blades 37 through the slots they provide, said slots being located directly above the slot formed by the conveyer tracks or guides 38. The chain of the conveyer travels within the angles 41 and to reduce the friction certain of the pins 42, forming the pivots of the chain, are provided with rollers 43 to facilitate the movement of the chain.

The arm 51 which supports the upper ends of the tracks or guides 38 receives the shackle hooks 46 after they arrive at the top of said tracks or guides. The hooks are transferred from this arm to the bleeding rails, two of which are provided in the present instance. Each bleeding rail consists of a rod 55 supported on hangers having an end 56 disposed adjacent and just beneath the track or guide ends. The two bleeding rails are arranged to dispose their ends 56 on opposite sides of the arm 51 and shackle hooks carried up by the conveyer and discharged onto the arm 51 slide along this arm until the free lobes or hook arms 48 engage over the bleeding rails down which they slide to the killing station. Both the rails and the arm 51 are inclined and the ends of the rails are bent in at 57 toward the arm 51 so that the hooks can engage the rails while still in engagement with the arm 51. It is of course desired that the hooks leave the arm 51 after engagement with the bleeding rails and to this end the upper portion of the arm is interrupted at 58, i. e., opposite the parts 57 of the rails.

It will be manifest that the shackle hooks can be attached from either side and that the conveyer can therefore readily serve two shackling pens, the hogs from one pen going up on one side of the guides and being thereafter transferred automatically to the bleeding rail at the same side. This lifting or transferring operation is completely automatic and in it one side of the shackling hook engages a conveyer, and subsequently the other side engages the bleeding rail.

If desired, a guide or support 59 may be provided upon the return side of the conveyer, and this, in the present instance, is supported by angle irons 61 extending up in the form of braces from the conveyer frame.

It will be manifest from the foregoing that the hogs are conveyed up and away from the attendant or attendants, instead of up and over them, as has been usually the case in the past, and also that the conveyer requires no solid walls or high partitions which would prevent the free circulation of air in and over the shackling pens, with greatly increased sanitation.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A hog hoist comprising in combination, a pair of conveyer guide tracks over which a shackle hook may be engaged, and a conveyer movable thereabove and having blades traveling between said guide tracks and adapted to engage shackle hooks and slide it along said tracks.

2. A hog hoist, comprising in combination, an elevating rail, a switch-track disposed at the upper end of said elevating rail, a bleeding rail one end of which is disposed adjacent said switch-track, and means for moving a shackle hook up said elevating rail, the aforesaid switch-track receiving the shackle-hooks directly from said elevating rail and provided with an inclined portion for gravitatively discharging said hooks automatically from the switch-track to the bleeding rail, substantially as specified.

3. In a hog-hoist, in combination: a double shackling-pen; a stationary shackle-supporting double track extending lengthwise horizontally through the middle of said pen and thence upward and away from it and terminating in a switch-track disposed adjacent the ends of a pair of bleeding-rails; a conveyer having its lower reach mounted above the aforesaid double track and provided with arms traveling between the two members of said double track and adapted to engage shackle-hooks hooked over and sliding on either side of said double track; the aforesaid switch-track receiving the shackle-hooks directly from the said double track and gravitatively discharging said hooks automatically to bleeding-rails on either side of said double track; substantially as specified.

4. In a hog-hoist, in combination: a double shackling-pen; a stationary double track extending lengthwise horizontally through the middle of said pen and thence upward and away from it and terminating in a switch-track disposed between converging ends of a pair of bleeding-rails; a conveyer having arms traveling between the two members of said double track and adapted to engage shackle-hooks hooked over and sliding on either side of said double track; the aforesaid switch-track receiving the shackle-hooks directly from the said double track and provided with an inclined portion for gravitatively discharging said hooks automatically from the switch-track to the laterally diverging portions of the bleeding-rails on either side of said double track; substantially as specified.

In testimony whereof we have hereunto set our hands before two subscribing witnesses.

ROBERT J. WATSON.
ARTHUR E. OZOUF.

Witnesses:
J. A. BOEDERS,
JAMES J. PESICKA.

Copies of this patent may be obtained for five cents each, by addressing the "Commissioner of Patents, Washington, D. C."